United States Patent [19]
Lee et al.

[11] Patent Number: 5,470,627
[45] Date of Patent: Nov. 28, 1995

[54] DOUBLE-SIDED OPTICAL MEDIA FOR A DISK STORAGE DEVICE

[75] Inventors: Neville K. Lee, Sherborn; Kwan Y. Tan, Boston, both of Mass.

[73] Assignee: Quantum Corporation, Milpitas, Calif.

[21] Appl. No.: 20,515

[22] Filed: Feb. 22, 1993

Related U.S. Application Data

[63] Continuation-in-part of Ser. No. 847,526, Mar. 6, 1992, Pat. No. 5,202,880.

[51] Int. Cl.$^6$ ........................................................ B32B 3/00
[52] U.S. Cl. .................... 428/64.4; 428/913; 369/275.2; 369/275.4; 369/277; 369/283; 369/286; 369/288; 430/270; 430/945
[58] Field of Search ............................... 428/64, 65, 913; 369/288, 275.2, 275.4, 277, 283, 286; 346/76 L, 135.1; 369/275.2, 275.4, 277, 283, 286; 430/270, 945

[56] References Cited

U.S. PATENT DOCUMENTS

| | | | |
|---|---|---|---|
| 4,918,556 | 4/1990 | Ezaki et al. | 360/97.02 |
| 5,202,880 | 4/1993 | Lee et al. | 369/275.4 |

FOREIGN PATENT DOCUMENTS

| | | | |
|---|---|---|---|
| 0329425 | 8/1989 | European Pat. Off. . | |
| 0341829 | 11/1989 | European Pat. Off. . | |
| 0410704A3 | 1/1991 | European Pat. Off. | G11B 7/14 |
| 0406569A3 | 1/1991 | European Pat. Off. | G11B 7/24 |
| 0443878 | 8/1991 | European Pat. Off. . | |
| 0456452 | 11/1991 | European Pat. Off. . | |
| 0461911 | 12/1991 | European Pat. Off. . | |
| 0461911A3 | 12/1991 | European Pat. Off. | G11B 11/10 |
| 0465269 | 1/1992 | European Pat. Off. . | |
| 0473785 | 3/1992 | European Pat. Off. . | |
| 0475529A1 | 3/1992 | European Pat. Off. | G11B 7/007 |
| 0483363A1 | 5/1992 | European Pat. Off. | G11B 11/10 |
| 9111807 | 8/1991 | WIPO . | |

OTHER PUBLICATIONS

Levene, "Applications For High Capacity, High Data Rate Optical Disk Buffer", Proceedings of Spie, vol. 899, 12 Jan. 1988, Bellingham, Wash. USA, pp. 279–283, XP000010870.
Patent Abstracts Of Japan, vol. 15, No. 255 (P–1221) 27 Jun. 1991 & JP–A–03083226 (Sony Corp.) 9 Apr. 1991.
Patent Abstracts Of Japan, vol. 16, No. 24 (P–1301) 21 Jan. 1992 & JP–A–03 237 631 (Sony Corp.) 23 Oct. 1991.
Patent Abstracts Of Japan, vol. 14, No. 569 (P–1144) 18 Dec. 1990 & JP–A–02 244445 (Hitachi Ltd.) 28 Sep. 1990.
Patent Abstracts Of Japan, vol. 14, No. 124 (P–1018) 8 Mar. 1990 & JP–A–01 319143 (Ricoh Co Ltd.) 25 Dec. 1989.

*Primary Examiner*—Patrick J. Ryan
*Assistant Examiner*—Elizabeth Evans
*Attorney, Agent, or Firm*—David B. Harrison

[57] ABSTRACT

A double-sided optical storage disk comprises a single substrate having a microstructure formed on each side surface thereof. The microstructure is in the form of grooves or pits arranged in a spiral or concentric circles. Formed on each side surface of the substrate are a reflective layer, and a transparent protective layer. The reflective layer is formed of aluminum alloy. The protective outer layer is formed of a transparent anti-corrosive material, specifically compatibly with an air-bearing, low-flying, read head, preferably silicon nitride.

14 Claims, 7 Drawing Sheets

DOUBLE-SIDED OPTICAL MEDIA FOR A DISK STORAGE DEVICE

CROSS-REFERENCE TO RELATED APPLICATIONS

This is a continuation-in-part of Ser. No. 07/847,526, filed Mar. 6, 1992, now U.S. Pat. No. 5,202,880 issued on Apr. 13, 1993, entitled "Double-Sided Magneto-Optical Media for a Multi-Disk Storage Device."

FIELD OF THE INVENTION

This invention relates generally to storage media for disk drives, and more particularly, to optical read-only and rewritable storage media.

BACKGROUND OF THE INVENTION

Like attics and garages, disk storage systems always seem to be full. As technical development continuously moves to greater storage capacities to keep pace with increased demand, the construction and arrangement of the recording media must likewise be improved.

A conventional high capacity magnetic disk storage system typically includes a plurality of disks spaced axially on a rotationally mounted spindle. Disk storage systems attain high storage densities by utilizing the maximum number of data surfaces for recording information within a given volume. For example, an industry standard "5 ¼ inch" (approximately 130 mm) disk storage system may store 600 MB on five disks, each disk storing 60 MB on each of its two surfaces. The number of disks that can be accommodated within a given form factor, or industry standard dimensions are limited by the height of the disk stack, the spacing between the disks, and the thickness of the disks.

Higher recording densities for optical media such as CDs can also be achieved by decreasing the distance between the read head and the storage media of the disk drive. Decreasing the fly height of the read head allows for the reading of data recorded at greater densities.

However, when the fly height is decreased, the roughness or asperity of the disk surfaces is a major concern. To ensure reliable operation, asperities are generally maintained at less than 60% of the head fly height. Likewise, static build-up on the magnetic surface of the disk is kept to a minimum to reduce static-friction ("stiction") which would tend to interfere with the flying of the heads.

Conventional optical storage systems have realized high storage capacities by virtue of the fact that optical recording techniques allow recording densities substantially greater than those used with magnetic media. Optical storage systems have evolved from write-once, read-only to systems that have rewritable capabilities. The introduction of magneto-optical ("M-O") media in particular, permits dynamic and bit wise modification of information after it has been initially recorded.

In a typical M-O storage system information is recorded on the media by directing a relatively intense, focused beam of light through an optically transparent substrates (substrate incident) at a small domain in a recording layer. The recording layer is generally an amorphous, vertically oriented, magnetic film preferably made of a rare-earth transition-metal alloy, such as Tb-Fe, Tb-Fe-Co, Gd-Co, Gd-Tb-Fe, or Gd-Fe. When the domain is heated to a Curie temperature in the presence of an external biased magnetic field, the domain is magnetically polarized to align with the external magnetic field. At the end of a write pulse the heated domain cools down and regains its permanent character, storing information as a vertically oriented magnetic domain. The orientation of the domain, up or down, indicates either a logical 1 or 0.

Information is read from the recording layer by directing a less intense beam of polarized light through the substrate at the recording layer. The polarization of the beam of light is partially rotated, for example, a fraction of a degree clockwise, or counterclockwise, by the magnetically oriented domains of the recording layer by either the Kerr or the Faraday effect. In the Kerr effect the incident lightbeam is reflected at the recording layer; in the Faraday effect the polarized lightbeam passes through the material rather than being reflected from its surface. The return lightbeam essentially retraces its path to a differential detector which decodes the polarization-modulated lightbeam into bits of information.

A typical M-O storage device may store, for example, 600 MB on a single surface of one 5 ¼ inch (130 mm) disk. However, optical path restrictions, and dimensional limitations related to the optical components, that is the various lasers, lenses, mirrors, beam splitters, and prisms, have generally not allowed the use of closely spaced multi-disk arrangements in compact industry standard packages such as those which are commonly used for magnetic storage devices. Also, because of their relative size, the optical read/write components of known systems are relatively remote from the media surface, and therefore surface asperity and stiction have generally not been a major concern in optical media design.

Increased capacity optical storage systems have typically used, for example, juke-box type of mechanical means that tediously present single disks to the optical system for writing and reading information. Some optical storage systems which do use double-sided disks include means for flipping the disk over to permit access to both sides of the disks by a single fixed optical system. At an increased cost, such double-sided disk systems have been provided with duplicate optical systems to permit simultaneous access to both sides of the disks. Alternative solutions include systems where the optical system is mounted on a movable arm which can be positioned axially to select a surface, and radially to access information recorded on one of the disk surfaces.

For these, and other reasons, optical storage systems are typically more amenable with applications that use sequential access to the recorded information, such as CDs, video disks, and archival storage systems. In general, optical storage systems have not concerned themselves with minimizing the spacing between the disks, and reducing the thickness of the disks to permit the construction of a compact high capacity, random access, multi-disk optical storage device.

For optical storage systems that do use double-sided media to increase their recording capacities, the double-sided disk is typically nothing more than two single sided disks meticulously arranged with one another in a confronted relationship. Each disk in such a paired arrangement includes an optically transparent substrate with spiral or concentric relief in the form of grooves or pits formed on one surface thereof. The relief provides the disk with a pre-formatted structure for storing information and facilitates tracking of the lightbeam.

The signal recording layer is deposited on the reliefed surface of each disk. The two, thus fabricated, single sided disks are then carefully aligned and bonded to each other with the signal recording layers being directed inwardly. The outwardly facing surfaces of the disks are usually coated with a protective layer, or lubricant to minimize corrosion, and wear and tear ("tribology"). The disadvantages of such a double-side disk are numerous. Since this type of disk uses two substrates, the total thickness of the finished disk is at least twice the thickness of the substrate, increasing the total space required for using such a disk in a multi-disk configuration. The increased weight of the disk increases the time and power required to spin the disk up to operational speed, and subject the drive motor to undue wear and tear. For substrate incident media, the substrate must be formed by a carefully controlled injection molding process to produce good transmittance and birefringence characteristics. The requirement for precise alignment and registration of the two substrates furthermore decreases process yield while increasing process cycle time. In addition, the surface topology of known optical disks is generally too rough to be compatible with low-flying air-bearing read/write heads. Excessive asperity and stiction increase the probability of fatal collisions if used with a low-flying air-bearing read/write head, as are commonly used with magnetic storage systems.

Accordingly, the known medium for optical disk storage systems increase the cost of assembly, require a carefully controlled injection molding process, and moreover, are not compatible with compact high capacity, multi-disk storage devices using low-flying air-bearing read/write heads.

It will also be appreciated from the foregoing that there is room for further improvement to the media proposed in the prior application. Specifically it would be desirable, that read-only storage media be provided which is compatible with magneto-optical storage media as defined in the prior application cross-referenced above, so that either rewriteable media, or read-only media can be used in the same disk storage system.

A common method of manufacturing of a read-only optical storage media generally includes the steps of forming a microstructure on the information bearing surface of a substrate. The microstructure generally is in the form of depressions or pits arranged in a spiral or concentric tracks. The microstructure can be formed by conventional embossing or molding techniques.

For read-only media, the microstructure usually has a depth which is approximately equal to ¼ the wavelength of the light beam that is used to read the data. A reflective layer, generally a metal alloy, is formed on the substrate to reflect the lightbeam. The microstructure increase the distance that the lightbeam travels during its incident and return paths by ½ wavelength. Destructive interference causes the intensity of the lightbeam to vary. The return light beam which is reflected at the substrate surface is sensed and decoded to yield digital signals corresponding to the data recorded in the microstructure of the disk.

In order to prevent damage to the reflective layer or the microstructure of the substrate during handling or by moisture, a protective layer is formed on the reflective layer. Prior art read-only disks have used a lacquer, a polycarbonate resin, or a thin glass plate.

However, such relatively thick protective layers are not compatible with low flying air bearing read heads. Therefore, the read heads and optical components such as focusing lenses are placed at a substantial distance from the recording surfaces of the disk. In a typical prior art read-only disk, the head may be as far as 0.001 centimeters from the surface, severely limiting the recording densities used to store information.

Low flying, low mass, air-bearing read heads, also known as sliders, such as are commonly used with magnetic media, typically fly at a distance of about 0.00001 centimeters form the disk surface. The relatively lack of asperity of the prior art read-only disk surfaces have generally not allowed the use of low flying sliders to achieve greater storage densities.

Therefore, it is desirable to provide optical media which can be used with a disk storage device which: is easy to manufacture with automated assembly equipment; uses minimal and inexpensive materials; is compatible with low-flying air-bearing read/write heads, and provides for an increased storage capacity without increasing the overall size of the system. Furthermore, it is desirable, for such media to be compatible with both read-only and rewritable optical storage systems, be they fixed or removable.

SUMMARY OF THE INVENTION

In accordance with one aspect of the invention, there is provided a low-profile magneto-optical media for double sided recording of information. The media comprises a single substrate having a preformatted relief in the form of tracking grooves or sampled-servo pits on each side surface thereof.

Formed on each of the reliefed side surfaces are the active layers of the media comprising thin-film materials which provide an optically transparent, low stiction, and asperity-controlled surface topology compatible with an air-incident lightbeam and a low-flying read/write head. The active thin-film layers, from the substrate outward are a reflective layer, a transparent dielectric layer, a magneto-optical recording layer, and a transparent protective layer.

The reflective layer is preferably formed of aluminum alloy. The dielectric layer is preferably formed of aluminum nitride or silicon nitride. The recording layer is formed of an amorphous vertically oriented magnetic material, preferably a rare-earth transition-metal alloy, for example, Tb-Fe-Co. The protective outer layer is formed of a transparent anti-corrosive material having sufficiently low stiction surface characteristics, specifically compatible with an air-bearing, low-flying, read/write head, preferably silicon nitride and an air incident lightbeam. That is, the stiction characteristics of the surface are sufficiently weak that they allow a flying read/write head to fly at a predetermined low height.

According to another aspect of the present invention, the substrate surface is partitioned into annular grooved and non-grooved zones. During the dynamic loading and tin-loading of the read/write heads of the device, the heads are pre-positioned above the non-grooved or "loading" zone of the disk surface. Thus, should the heads accidentally touch down on the surface during loading or unloading information will not be damaged. Also, by providing the disk surface with a loading zone, the disk may be used with static contact start/stop heads which are, because of excessive wear and tear, generally not tribologically compatible with annular grooved surfaces, particularly if such surfaces are lubricated.

According to a further aspect of the invention, a plurality of single substrate, double-sided disks are spaced closely apart about a rotatably mounted spindle to provide at least ten recording surfaces for a M-O storage device in a 5 ¼ inch (130 mm) form factor package.

In accordance with another aspect of the invention, there is provided a low asperity read-only optical media which provides for the recording of information on both sides thereof. The media comprises a single polycarbonate substrate having a microstructure formed on each side surface of the substrate. The microstructure is in the form of depressions or pits arranged in a spiral or concentric circles.

Deposited on each side surface of the substrate are a reflective layer, and a transparent protective layer. The reflective layer is preferably formed of aluminum alloy. The protective outer layer is formed of a transparent anti-corrosive material, specifically compatibly with an air-bearing, low-flying, read head, preferably silicon nitride.

According to another aspect of the read-only embodiment of the present invention, the substrate surface is partitioned into two annular zones. A first zone including the microstructure, and the second zone does not. That is, the second zone is substantially flat. During the dynamic loading and unloading of the air-bearing read heads, the head is pre-positioned above the flat zone of the disk surface. Thus, should the heads accidentally touch down on the surface during loading and unloading, information will not be damaged. Also, by providing the disk surface with a flat ungrooved zone, the disk may be used with static start/stop heads.

In yet another embodiment of the invention, there is provided a low asperity optical hybrid media for recording some information as read-only, and recording some information as rewritable.

In one form, the hybrid media comprises a single substrate having a microstructure on a first side surface which is compatible with magneto-optical recording methods. The first side surface includes from the substrate outward a reflective layer, a transparent dielectric layer, a magneto-optical recording layer, and a transparent protective layer.

The second side surface of the substrate having a microstructure compatible with read-only recording methods. The second side surface includes from the substrate outward a reflective layer, and a transparent protective layer.

In another form, the surface of the hybrid media is partitioned into two annular zones. A first zone includes a microstructure compatible with magneto-optical recording methods. A second zone includes a microstructure compatible with read-only recording methods. The active thin-film layers deposited on the side surface include from the substrate outward a reflective layer, a transparent dielectric layer, a magneto-optical recording layer, and a transparent protective layer.

In yet another form of the hybrid media, some of the information, such as for example, servo, or formatting data, is recorded as read-only, and other information, such as user data is rewritable.

These and other features and advantages of the present invention will become apparent from a reading of the detailed description in conjunction with the attached drawings in which like reference numerals refer to like elements in the several views.

DETAILED DESCRIPTION OF THE INVENTION

Figure 1:
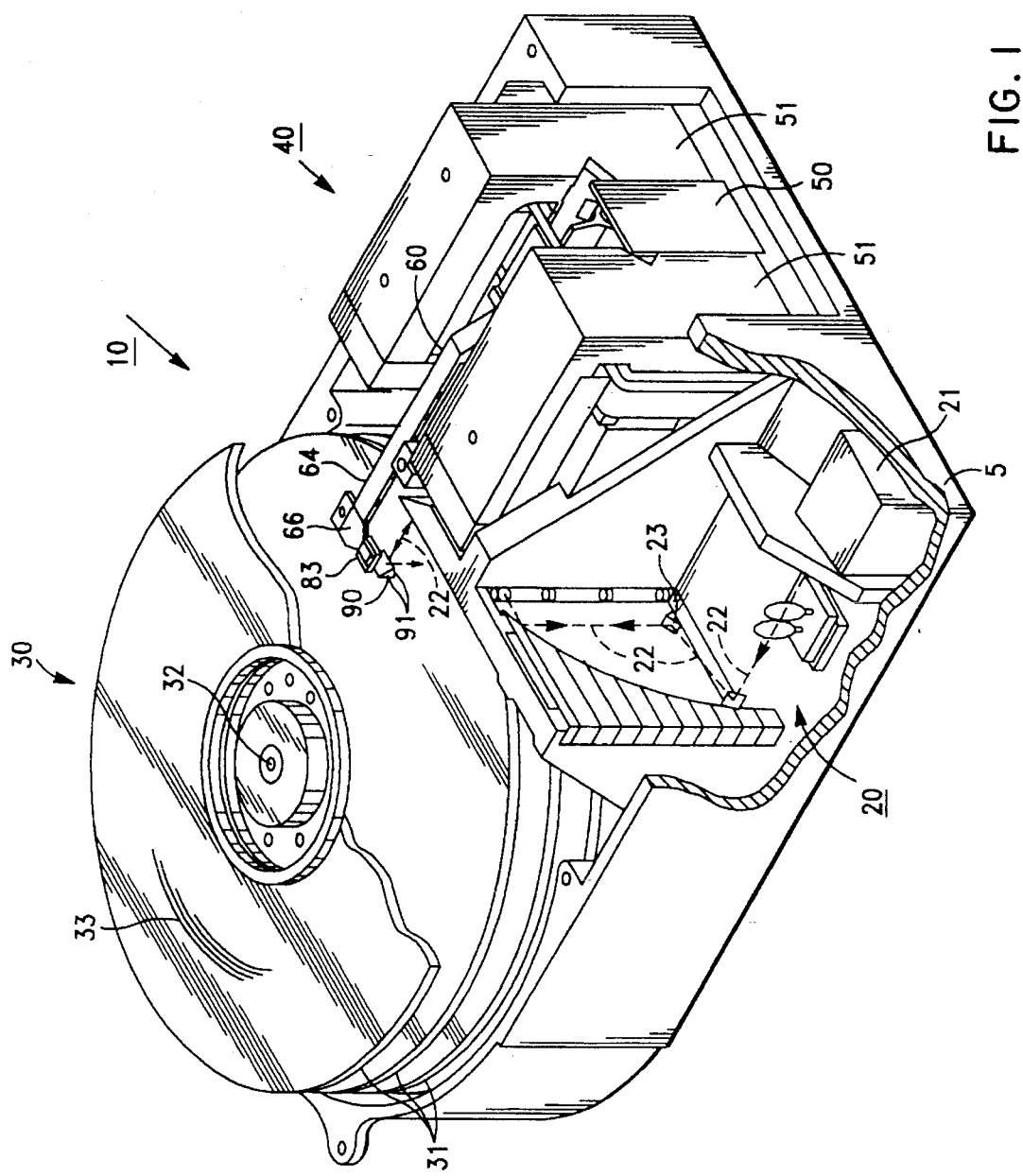
FIG. 1 is a perspective view, partially broken away, of a multi-disk, magneto-optical storage system which can use the device of the present invention.

FIG. 1 shows a multi-disk optical storage system 10 comprising a optical assembly 20, a disk assembly 30, and a carriage assembly 40 firmly secured on a mounting base 5.

The optical assembly 20 comprises a single stationary laser source and detector 21 emitting a lightbeam, generally indicated by a broken line 22. The directed lightbeam 22, as will be explained in further detail herein, is used to write and read information on the storage media of the disk assembly 30. For that purpose, the lightbeam 22 is concurrently distributed, by means of various stationary and movable mirrors, for example a mirrored galvanometer 23, polarizers, beam splitters, lenses, and prisms, to the various surfaces the disk assembly 30. At the recording media of the disk assembly 30, the lightbeam 22 is reflected to essentially retrace its path back to the detector 21.

The disk assembly 30 comprises a plurality of double sided disks 31 axially spaced about a rotatably mounted spindle 32. The system 10 has, for example, six double sided disks 31. The top surface of the top disk and the bottom surface of the bottom disk are generally not used for information storage purposes. Thus, the system 10 has, by way of example, five pairs of opposingly facing data surfaces for recording information. The disk assembly 30 is compatible with a so called "5 ¼ inch" form factor drive. The term "form factor" means the external outline, (height, width and length), required for the drive assembly including its on-board control electronics. It should be noted, that the system 10 can also be made compatible with other form factors.

The recording media on the surfaces of the disks 31, as will be discussed in greater detail herein, are layered on a circular substrate entirely by thin-film forming techniques such as sputtering or vacuum deposition. As previously stated, for rewritable disks the recording media uses magneto-optical (M-O) effects. The feature which is common M-O media is a layer of magnetic material that has the axis of magnetization perpendicular to the amorphous thin-film surface and for which the Kerr effect is great.

The substrate is generally "pre-formatted" with microscopic surface relief 33 in the form of, for example, tracking grooves or servo-sampled pits to provide a physical structure for storing information. The grooves or pits can be formed by conventional embossing or molding techniques. The grooves 33, when used for storing randomly accessible information, are usually formed in closely spaced concentric circles, commonly known as tracks. However, the apparatus of the invention, as disclosed herein, can also be used with substrates grooved in a spiral configuration. Spirally reliefed disks are typically used with systems storing primarily sequentially accessible information.

The carriage assembly 40 comprises a linear actuator 50 and carriage body 60. The linear actuator 50 includes two motor housings 51 containing permanent magnets, spaced apart and secured to the mounting base 5 with the carriage body 60 disposed therebetween. The carriage body 60, includes a plurality of integrally formed cantilevered carriage arms 64. The carriage arms 64 are vertically ganged one above one the other. There are, for example, five carriage arms 64 for insertion between the six disks 31 of the disk assembly 30. Each of the carriage arms 64 is identically shaped and dimensioned for positioning the read/write head assemblies 66 adjacent to the recording layers of the disks 31.

Figure 2:
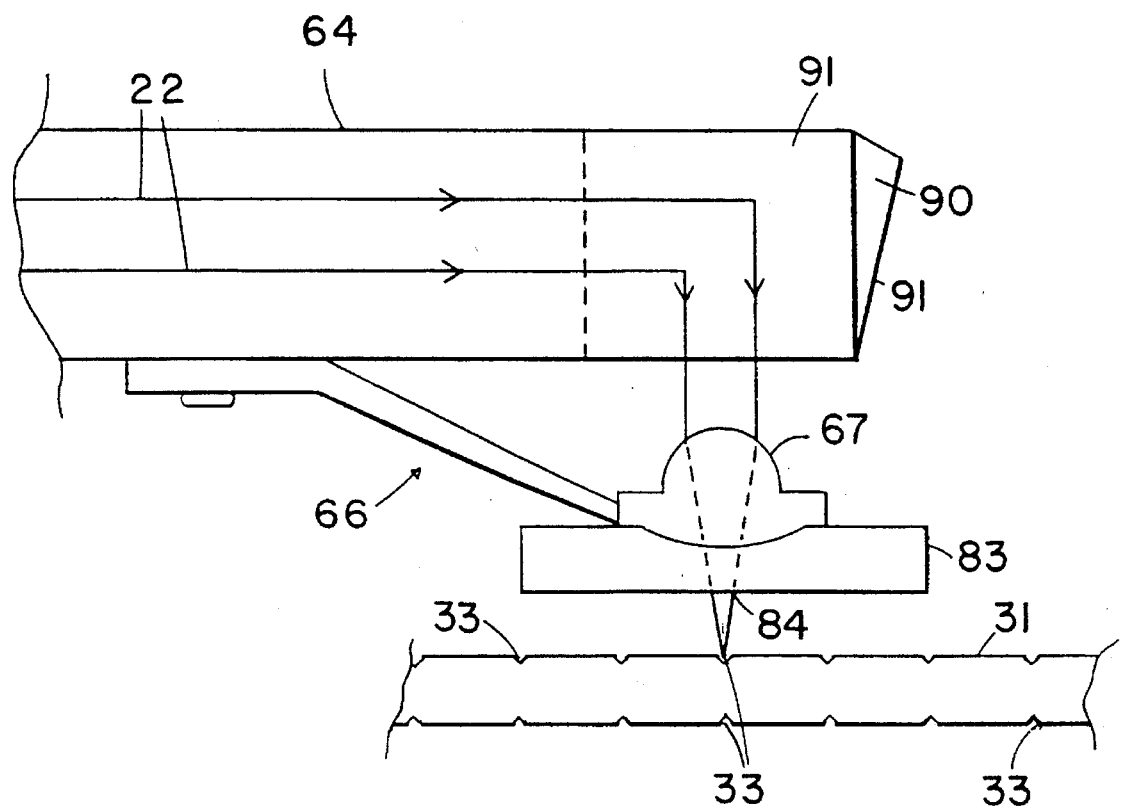
FIG. 2 is a side elevated view, partially broken away of the head assembly and disk of FIG. 1.

Now also with reference to FIG. 2, each of the head assemblies 66 comprises an objective lens 67 for focusing the lightbeam 22. The head assembly 66 also includes a slider 83 having a miniature magnetic coil, not shown, for polarizing the recording media of the disk 31, and a microscopic optical aperture 84 for the focused lightbeam 22 to pass through. Also attached at one free end of each of the carriage arm 64 is a triangular or prismatically shaped mirror, hereinafter referred to as folding prism 90. Each prism 90 has two planar reflective surfaces 91 arranged at ninety degrees with respect to each other for directing the lightbeam 22 at one of the objective lens 67 which focuses the lightbeam 22 onto the surface of the disk 31.

The laser source 21 of the optical assembly 20, typically a laser diode, emits a diverging lightbeam 22 which is collected and collimated by a lens and made circular by a prism. This circular lightbeam 22 is selectively aimed by various optical components, including lenses, mirrors, beam splitters, and prisms, at the reflective surface 91 of the folding prisms 90.

At the reflective surface 91 the horizontal lightbeam 22 is folded over into a vertical direction and directed through the objective lens 67, the optical aperture 84 in the slider 83 to be focused at the recording layer of the disks 31.

To write information on rewritable media, a relatively high intensity lightbeam 22 is used, for example in the range of about 8 to 15 mW. The lightbeam 22 is directed at the recording layer to be time and space coincident with the biased magnetic field created by the magnetic coil of the slider 83. Heating a domain in the presence of the biased magnetic field vertically orients the amorphous magnetic layer according to the orientation of the external magnetic field.

To read information on rewritable media, a relatively low intensity polarized lightbeam 22 is used, for example in the range of about 2.0 to 2.5 mW, depending on the rotational frequency of the spinning disks 31. During reading, the polarized lightbeam 22 is rotated clockwise or counterclockwise through an angle in the range of about (0.6 to 2.0 degrees at the recording layer by the Kerr effect. The lightbeam 22 is reflected at the surface of the disk 31 to essentially retrace its path to a polarizing beam splitter.

Conventional beam splitting techniques are well-known and generally include a polarization sensitive prism. The prism splits the return lightbeam into "up" and "down" components corresponding to the clockwise or counter-clockwise angles induced by the Kerr effect. The thus spill lightbeam is then directed at conventional photo-detectors, and the output of the photo-detectors are differentially processed, that is the "up" and "down" signals are subtracted from each other, to generate a signal which can be decoded into bits of information.

During the operation of the system 10 the double sided disks 31 are rotated at high speed, for example in the range of 2400 to 4800 revolutions per minute, by an electrical motor not shown. The sliders 83 are low-mass, low-profile, and air-bearing designed to fly at a height in the range of about 0.5 to 2 microns above the surfaces of the double sided disks 31. To write or read information on the surfaces of the disks 31 the carriage body 60 is approximately positioned above a predetermined track, (commonly known as coarse seeking), and the lightbeam 22 is directed by the galvanometer 23 at the corresponding reflective surface 91 of the prisms 90. The lightbeam 22 is deflected by the reflective surface 91 to the objective lens 67 and focused by the components of the optical assembly exactly on one of the tracks of the disks 31 (commonly known as fine seeking).

Figure 3:
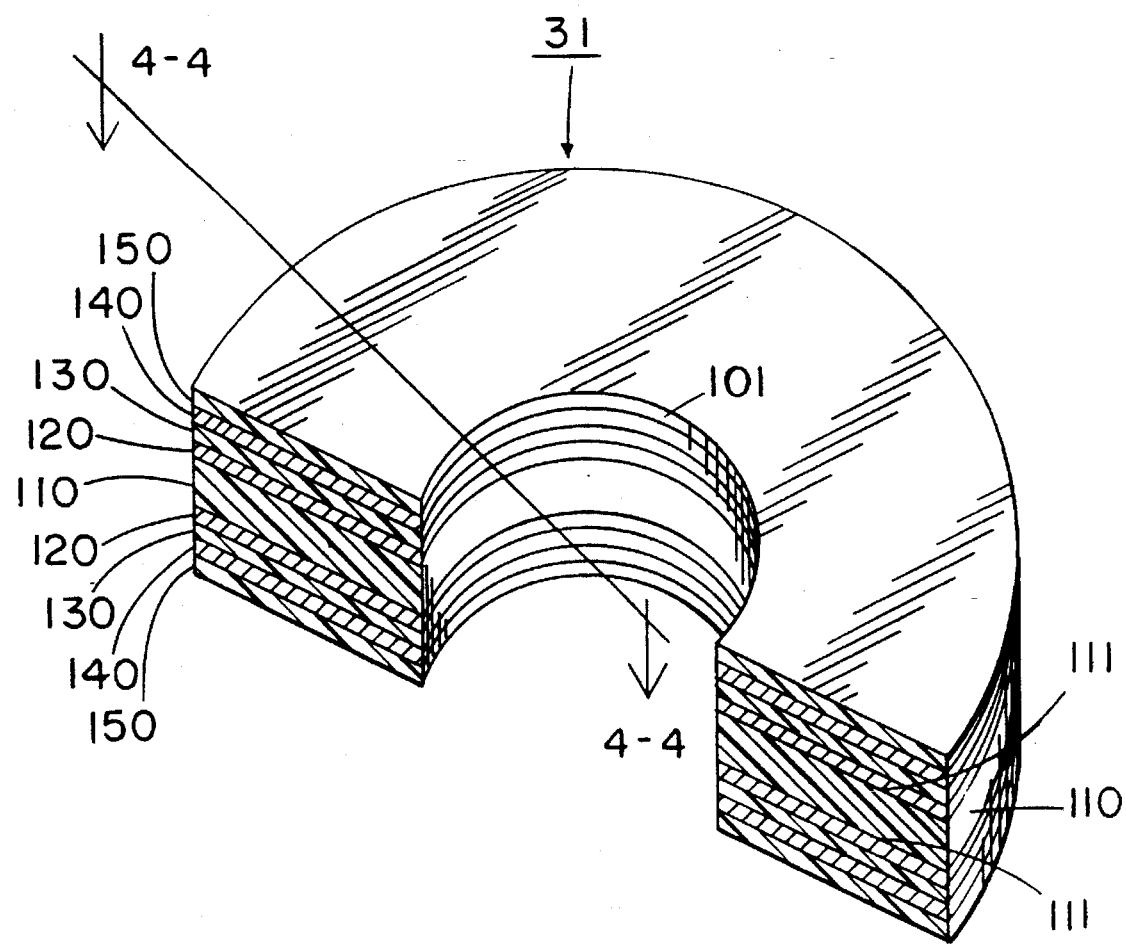
FIG. 3 is a fragmentary perspective view of a double-sided disk according to one embodiment of the invention.

Now, with reference to FIG. 3, each of the disks 31, according to one embodiment of the invention comprise a single substrate 110 having a quadri-layer structure symmetrically formed on each side surface 111 thereof. The active layers of the recording media are formed entirely as thin-film layers which provide the disks 31 with a transparent, low stiction, and asperity-controlled external surface topology compatible with the air incident lightbeam 22 and the low-flying read/write head assembly 66. That is, by using thin-film layers, the asperity or roughness of the outer surface of the disks 31 can be maintained at less than 60% of the predetermined fly height of the heads 66, nominally in the range of 0.5 to 2 microns. The layers comprise in order, from the substrate 110 outward, a reflective layer 120, a dielectric layer 130, a recording layer 141}, and a protective layer 150.

The reflective layer 120 is generally formed of a metal alloy. The dielectric layer 130 is formed of a transparent material such as silicon nitride or aluminum nitride. For magneto-optical rewritable recording media there are well known a number of materials suitable for the recording layer 140, for example, materials made of a rare-earth transition-metal alloy, such Tb-Fe-Co. The Curie temperature, that is the temperature at which the coercivity of the material is negligible, for a Tb-Fe-Co alloy is, for example, in the range of about 180 to 220 degrees Celsius. The compensation point temperature, which can be made lower than the Curie temperature by adjusting the relative proportions of rare-earth and transition metal components of the alloy, is in the range of about 60 to 130 degrees Celsius. The outer protective outer layer 150 is formed of a transparent dielectric, by way of example, silicon nitride, specifically compatible with low-flying, air-bearing sliders 83.

In order that those skilled in the art will better understand the practice of the present invention, an example of the present invention is given below by way of illustration and not by way of limitation.

Figure 4:
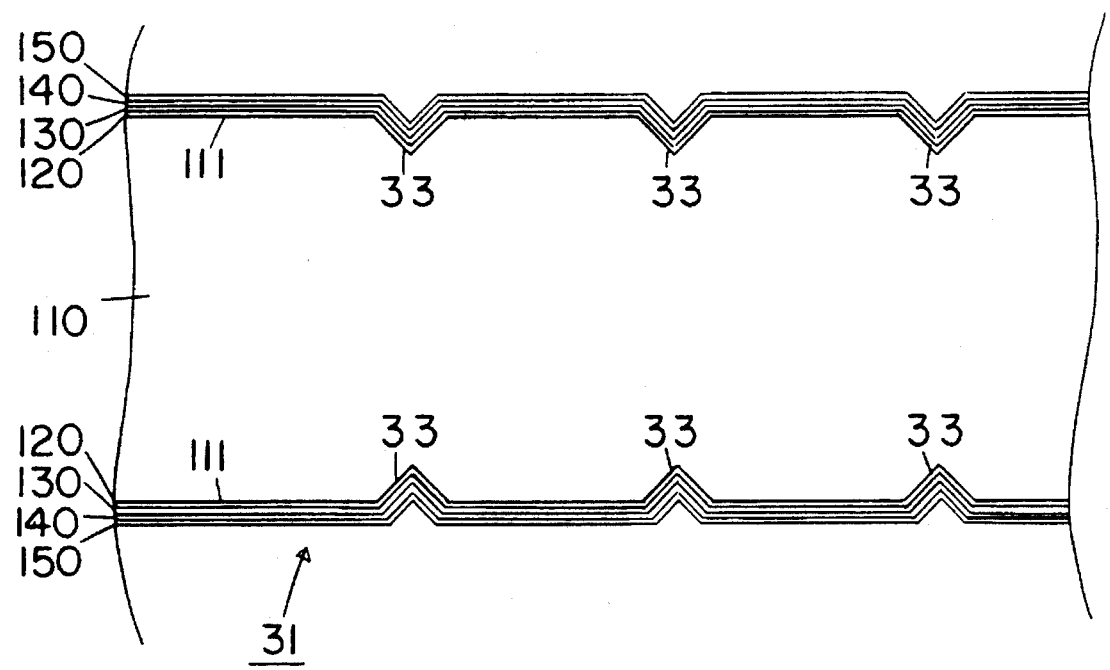
FIG. 4 is a cross-sectional view, partially broken away, of the disk of FIG. 3 along line 4—4.

As shown in FIGS. 3 and 4, a grooved or "pre-formatted" disk 31 is prepared by: 1) molding a substrate 110 from a light weight, low warpage material, for example, bisphenol-A polycarbonate or a similarly characterized polymers; or 2) photopolymer ("2P") replication of a substrate; or 3) chemically etching (contact printing) of a substrate made from a material such as glass or aluminum. Since the light beam 22 is air incident, and not through the substrate 110 (substrate incident), as in most conventional optical disks, the optical quality of the disk is of minimal concern. For example, the substrate 110 does not need to be corrected for birefringence or transmittance. As an advantage of the present invention, the substrate material can be selected to optimize weight, rigidity, durability, and cost.

The substrate 110 has an outer diameter of 130 mm, to make a so called industry standard "5 ¼ inch" disk. The substrate 110 is formed with a centrally located circular hole 101 for mounting the fabricated disk 31 axially about the spindle 32 of the system 10, shown in FIG. 1. The inner diameter of the hole 101 is 40 mm. The substrate has a nominal thickness of 1.2 mm. It should be apparent that other sizes may also be used.

Each side surface 111 of the substrate 110 includes a relief in the form of a plurality of conventional concentric grooves 33, as shown not to scale in FIG. 4, commonly known as tracks. The grooves 33 which provide a physical structure for facilitating the guiding of the lightbeam 22 during operation of the optical system 10 are, by way of example, spaced apart about 1.0 um. The grooves 33 have, nominally, a width of about 0.4 um, and a depth of 0.1 um. The profile of the grooves 33 is, for example, V-shaped. Although an optical storage system 10 of the type that is used for random access typically has a grooved geometry that is concentric, disks having grooves formed in a spiral geometry may also be used.

Since the size of the optical components in the head assemblies 66 requires a large inter-disk spacing compared to magnetic disk drives, dynamic head loading becomes a practical problem. Therefore, each side surface 111 of the substrate 110 can optionally include an annular non-grooved zone above which the head assemblies 66 are positioned during loading and unloading to improve reliability. During the operation of the system 10, when the sliders 83 are loaded or unloaded, they are positioned above the non-grooved zone. Thus, should there be an accidental touchdown on the surfaces of the disks 31 during operation, recorded information will not be destroyed. Also, if a non-grooved zone is included, the disk 31 can be used with an optical system 10 of the type that use static contact start/stop head loading techniques. With static contact start/stop loading the sliders 83 are resting or sliding on the surfaces of the disks 31 until the disks 31 attain sufficient angular velocity to permit the sliders 83 to fly at their normal operational height above the surface.

Built tip on each side of the thus grooved surface 111 of the substrate 110 are the various thin-film layers that comprise the recording media. Since each side surface 111 of the substrate 110 is built up as a mirror image of the other, the various layers will only be described with respect to one of the side surfaces 111. The layers are generally applied by conventional, thin-film coating techniques such as vacuum deposition or sputtering. Such techniques, are well known in the art, and therefore do not require further description herein. It should be noted that the thin-film layers generally conform to the surface topology of the substrate.

The reflective layer 120 is formed of a metal, for example, preferably an aluminum alloy. The purpose of the reflective layer 120 is to reflect the lightbeam 22 back through the recording layer 130, where destructive interference of the incident polarization enhances light absorption, thereby enhancing media sensitivity and Kerr rotation. Furthermore, the thickness of the reflective layer 120 can be adjusted to optimize the thermal characteristics of the media. It has been determined that good reflective results can be obtained by having the reflective layer 120 be in the range of about 200 to 500 Angstrom thick for a polycarbonate substrate 110. However, other thicknesses may be optimal for a substrate 110 made of a glass or metallic material.

The transparent dielectric layer 130 is formed on the reflective layer 120 and typically comprises aluminum nitride or silicon nitride. The purpose of the dielectric layer is to enhance the Kerr effect and also to provide a corrosive resistant boundary between the reflective layer 120 and the recording layer 140. Good isolating results have been obtained with a dielectric layer 130 having a thickness in the range of about 150 to 400 Angstrom thick.

The recording layer 140 is formed on the dielectric layer 130. The recording layer generally comprises a vertically oriented, amorphous magnetic material, for example, a rare-earth transition-metal alloy, such as Tb-Fe-Co. The purpose of the recording layer is to provide the media with the capability to store information in vertically biased magnetic domains. The domains have a length in the circumferential direction in the range of about 0.6 to 0.9 micrometer. Typically, the recording layer 140 is about 150 to 500 Angstrom thick, although other thin-film thicknesses may be appropriate for amorphous magnetic materials of different composition.

The protective layer 150 is formed on the recording layer 140. One purpose of the protective layer 150 is to prevent corrosion of the recording layer 140. In addition, as another purpose, the surface of the protective layer 150 must be compatible with the low-mass, air-bearing sliders 83 comprising, for example, an aluminum oxide, titanium carbide ($Al_2O_3$-TiC) material. Experimentation with various materials has revealed that not all known protective coatings for M-O medium, for example, aluminum nitride, silicon carbide, or silicon dioxide, would allow the low-mass sliders 83 to fly reliably at low-heights, for example in the range of 0.5 to 2 microns. That is, with such tribologically incompatible materials the sliders 83 would eventually fatally crash onto the surface of the media. According to the present invention, the preferred material for the protective layer 150, compatible with the low-mass air-bearing sliders 83 is silicon nitride ($Si_3N_4$). The protective layer 150 of silicon nitride having low-stiction and minimal asperity has a thickness in the range of about 400 to 800 Angstrom.

Advantages of the double-sided single substrate disk according to the present invention, heretofore unobtainable by the prior art, include a low-profile rewritable optical media which can used with a reduced height multi-disk stack. Also, the disk can be made with less steps, and with lower cost materials. The double-sided, air-incident substrate as disclosed herein is of reduced weight and therefore consumes less power during operation. Furthermore, the low-stiction, asperity-controlled disk is compatible with a dynamically loadable flying read/write head, permitting greater recording densities.

Figure 5:
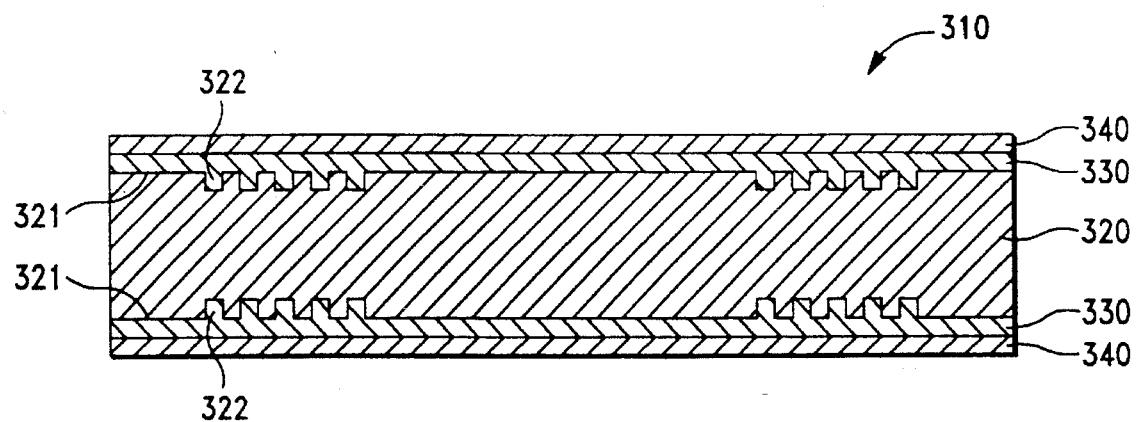
FIG. 5 is a cross-sectional view of a double-sided, read-only disk media according to an embodiment of the invention.

FIG. 5 shows an double-sided read-only optical disk 310 comprising a single substrate 320 having a two layer thin-film structure symmetrically formed on each side surface 321 thereof. The layers comprise in order, front the substrate 310 outward, a reflective layer 330 and a protective layer 340.

The substrate 320 is prepared by molding a light-weight, low warpage material, for example, bisphenol-A polycarbonate or a similarly characterized polymers. The thickness of the substrate 320 is approximately 1.2 mm. Since the light beam used to read information recorded on the disk 310 is air incident, that is directly onto the recording media, and not through the substrate 320 as in most conventional optical disks, the optical quality of the substrate 320 is of a lesser concern. For example, the substrate 320 does not need to be corrected for birefringence. As an advantage of the present invention, the substrate material can be selected to optimize weight, rigidity, durability, and cost.

The substrate 320 has an outer diameter of 92 mm, to make a so called industry standard "3 ½ inch" disk. It should be apparent to one skilled one the art that the substrate 320 can be made other sizes. Each of the side surfaces 321 of the substrate 320 includes a microstructure in the form of a plurality of depressions or pits 322, in a spiral or concentric configuration.

The pits have a depth equal to ¼ the wave length of the light beam used to read the disk 320. That is, the grooves 322 lengthen the path of the lightbeam by ½ a wave length to cause destructive interference in the lightbeam. The profile of the pits 322 is generally squared.

Figure 5A:
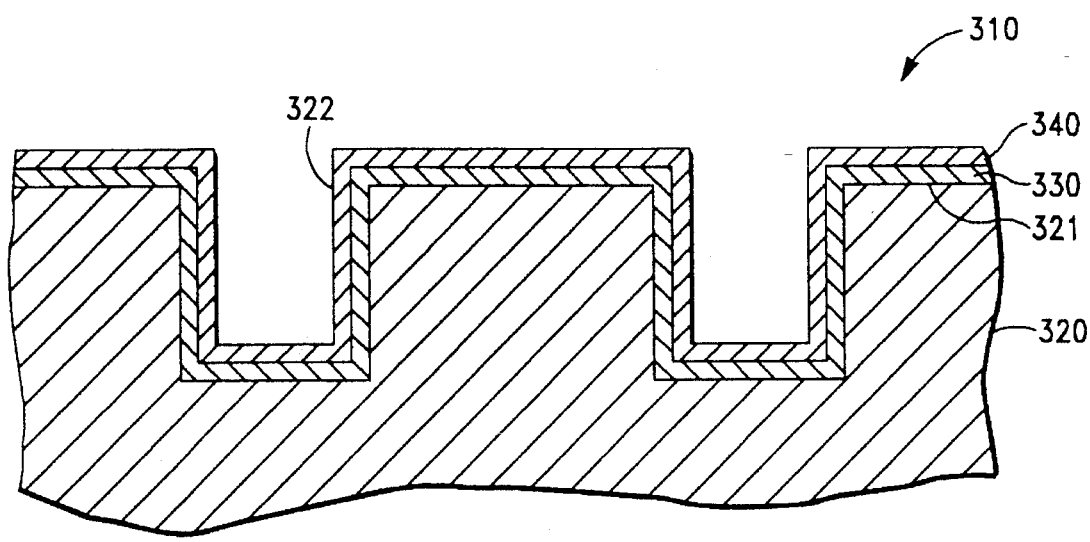
FIG. 5A is a partial enlargement of the view of FIG. 5.

Built up on each side of the thus grooved surfaces 321 of the molded substrate 320 are the reflecting layer 330 and the protective layer 340. Since each side surface 321 is built up as a mirror image of the other, the layers 330 and 340 will only be described with respect to one of the side surfaces 321. The layers 330 and 340 are generally applied by conventional, thin-film coating techniques such as vacuum deposition or sputtering. Such techniques, are well know in the art, and therefor do not require further description herein. It should be understood that the thin-film layers described herein with reference to FIGS. 5–7 generally conform to the surface topology of the substrate, as is shown in the enlargement of FIG. 5A.

The reflective layer 330 is formed of a metal, for example, preferably an aluminum alloy. The reflective layer is typically in the range of about 600 (+/– 200) Angstrom thick. The purpose of the reflective layer 330 is to reflect the lightbeam used to read the disk 310.

It should be noted that the photo-detector 21 of the optical assembly 20 can also be used with read-only media. Instead of differentially processing the signals by subtraction as previously described for rewritable media, with read-only media the signals from the beam splitter are simply summed, since the modulations induced in the lightbeam 22 by the ¼ wavelength relief 322 cause the amplitude of the signals corresponding to the split lightbeam to rise and fall in phase. The summed signal is decoded to provide the bits of the read-only recorded information.

The protective layer 340 is formed on the reflective layer 330. One purpose of the protective layer is to prevent corrosion or physical damage of the reflective layer 330. The protective layer 340 is made of a transparent dielectric material to a thickness in the range of about 500 to 2000 Angstroms, preferably about 1000 Angstroms. In conventional read-only optical disks, the protective layer made of lacquer is about one hundred times the thickness, that is, in traditional lacquered disks the protective layer is in the range of 500,000 to 200,000 Angstroms. Such lacquered surfaces generally have a inferior asperity or flatness and are not compatible for use with a dynamically loaded, air-bearing low-flying read head.

Experimentation with various materials has revealed that not all known protective coatings known for optical disks, such as aluminum nitride, silicon carbide, or silicon dioxide, would allow the read head to fly close to the surfaces 321 of the disk 310. That is, with such incompatible materials the read head would eventually fatally crash onto the surface of the disk 310. According to the present invention, the preferred material for the protective layer 340, compatible with a low-mass air-bearing read head, is silicon nitride ($Si_3N_4$). By using a silicon nitride protective layer 340, the surfaces 321 of the disk 310 have a superior asperity ratio permitting the read head to fly at submicron distances, thereby permitting higher recording densities.

Figure 6:
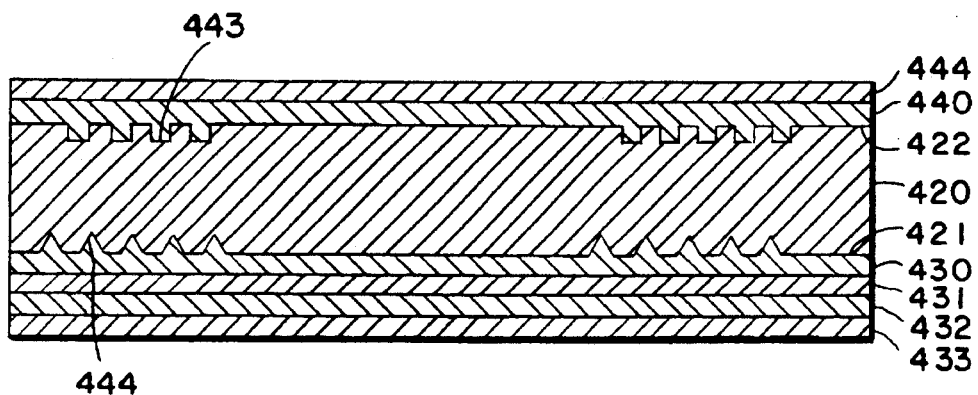
FIG. 6 is a cross-sectional view of a hybrid read-only/rewritable optical disk media.

FIG. 6 shows a hybrid optical storage media which permits both rewritable data and read-only data to be stored on a single disk. In one embodiment of the hybrid optical media, the disk includes a single substrate 420, having one side surface 421 built-up with recording layers compatible with rewritable technique, and another side surface 422 built-up with recording layers compatible with read-only techniques. For example, the side surface 421 includes a reflective layer 430, a dielectric layer 431, a magneto-optical recording layer 432, and a protective layer 433. The relief 444 on the side surface 421 is compatible with M-O techniques. The side surface 422 includes a reflective layer 440 and a protective layer 441, as described herein for read-only disks.

During operation of, when the system 10 is accessing information on the "rewritable" surface 421 data may be written or read. When operating on the "read-only" surface 422 data can only be read.

Figure 7:
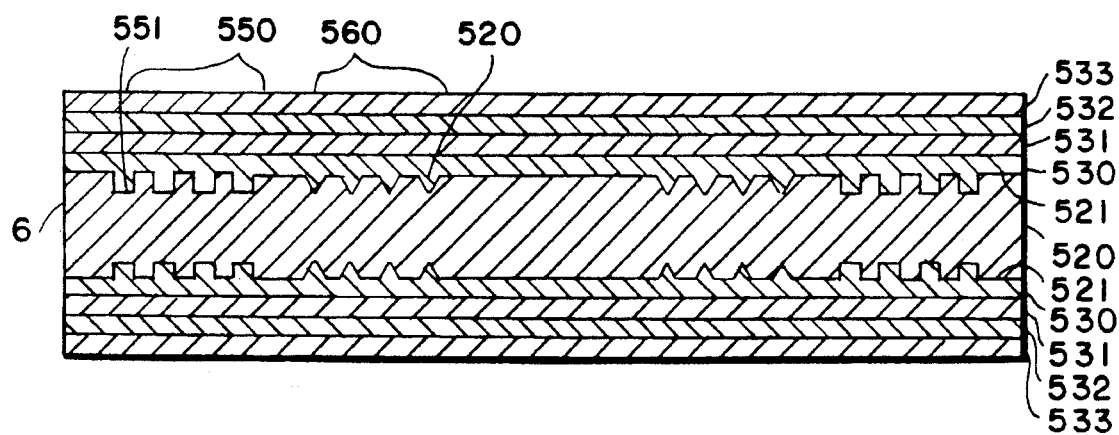
FIG. 7 is a cross-sectional view of another arrangement of a hybrid optical disk media.

FIG. 7 shows another embodiment of a hybrid rewritable/read-only media. In this embodiment, some of the data on the side surfaces 521 are rewritable, and some of the data are read-only. For example, a relief 551 in a first annular zone 550 is compatible with read-only techniques, and a relief 552 in a second zone 560 is compatible with rewritable techniques. The layers 530–533 are in the form of a quadrilayer M-O structure. When the system 10 is operating in the first zone 550 data can only be read. Whereas, in the second zone 560 data can be written or read. The relative location of the tracks in the "read-only" and "rewritable" zone can be predetermined or recorded on the media itself to permit variations in the location and size of the zones 550, 560 from disk to disk.

Figure 8:
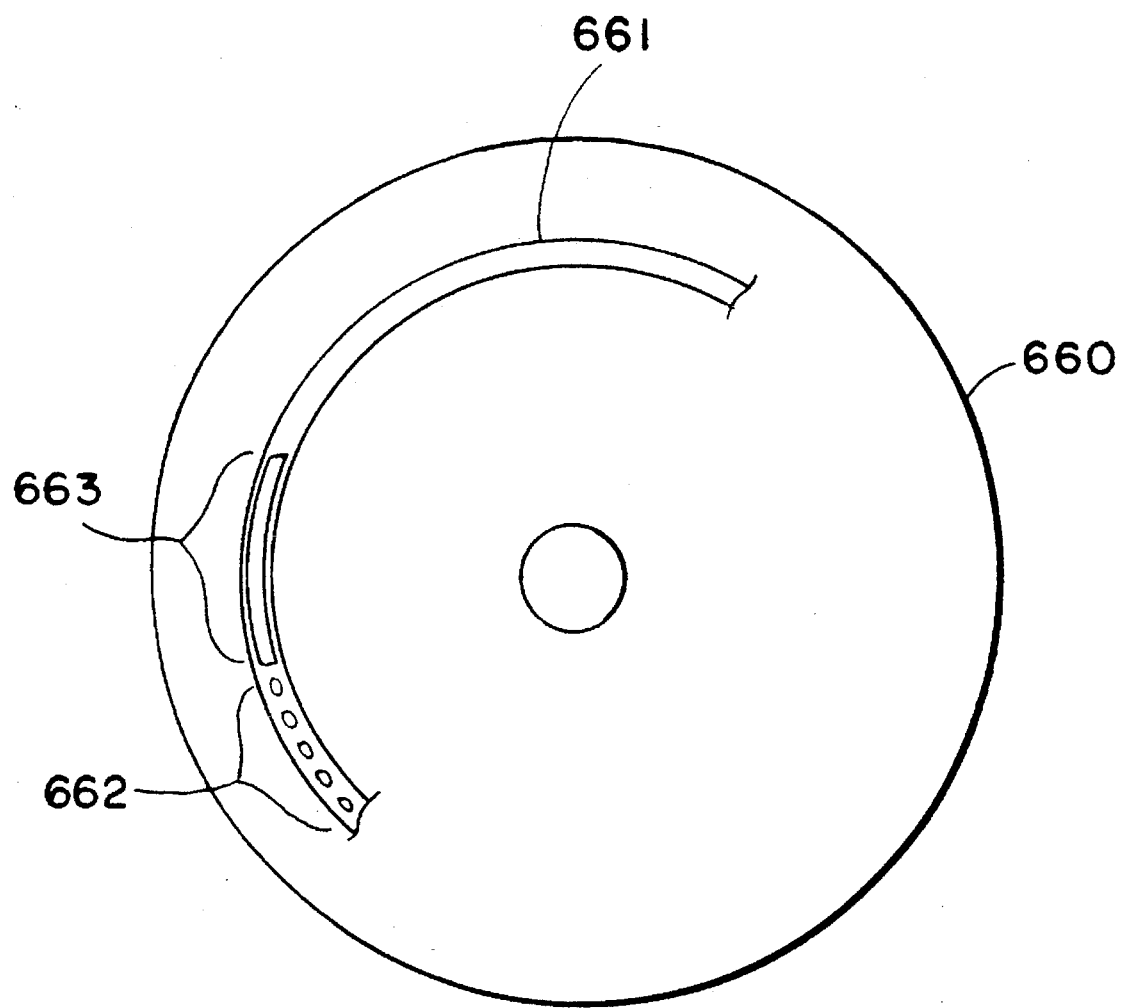
FIG. 8 is a cross-sectional view of yet another arrangement of a hybrid disk media.

FIG. 8 shows yet another embodiment of a hybrid rewritable and read-only disk 660. According to this embodiment, some of the data within a track 661 are made read-only, and some of the data are made rewritable. For example, the data in the area generally indicated by reference numeral 662 has a relief structure generally compatible with read-only techniques, for example, ¼ wavelength pits. The data in the area indicated by reference numeral 663 has a relief structure compatible with M-O rewritable techniques. When the system 10 is reading "read-only" data the outputs of the photo-detector 21 are summed, otherwise, when the system 10 is reading "rewritable" data the signals are differentially processed. This hybrid arrangement has the advantage that some data, such as servo and formatting data can be prerecorded and be protected from overwriting. Other data, such as user data, can be made rewritable. Thus a single disk hybrid media can be constructed which combine the advantages of both read-only and rewritable recording techniques.

While certain representative embodiments and details have been shown for the purpose of illustrating the invention, it will be apparent to those skilled in the art that various changes and modifications may be made in this invention without departing from its true spirit or scope which is indicated by the following claims.

What is claimed:

1. An optical disk for use with a lightbeam and an air-bearing low-flying head of a rotary disk device for storing information comprising:

a substrate having a microscopic relief formed on a side surface 4 thereof to provide a pre-formatted structure for storing information;

a thin-film reflective layer applied on said side surface to reflect an incident lightbeam used for reading information: and a transparent thin-film protective layer applied on said reflective layer, the asperity of the surface of said protective layer being generally not greater than 60% of the predetermined fly height of the air-bearing low-flying head, and the composition of said protective layer having stiction sufficiently weak to allow the head to fly over the disk at said predetermined height during operation of the disk in a rotary disk device.

2. The optical disk as in claim 1 wherein said relief has a depth approximately equal to ¼ the wavelength of the lightbeam.

3. The optical disk as in claim 1 wherein said protective thin-film layer is transparent to be compatible with an air incident lightbeam.

4. The optical disk as in claim 1 wherein said side surface is partitioned into a first and second annular zone, that portion of said side surface in said first annular zone including said relief, and that portion of said side surface in said second annular zone being substantially flat.

5. The optical disk as in claim 1 wherein said substrate is optically opaque.

6. The optical disk as in claim 1 wherein said protective layer includes silicon nitride for use with a head made of an aluminum-oxide-carbide material.

7. A double sided optical storage media for a storing information in a high storage density information storage system comprising:

a substrate having two side surfaces, each of said side surfaces having a microscopic relief formed on an annular portions thereof;

a thin-film reflective layer on each of said side surfaces of said substrate to reflect a lightbeam; and a transparent thin-film protective layer on each of said reflective layers, the composition of said protective layers having stiction sufficiently weak and asperity sufficiently low to allow a heads to fly over the double sided media at a predetermined low height during operation of the information storage system.

8. A high density optical storage system for storing information comprising:

a plurality of disks axially mounted on a rotatable spindle, each of said disks having two side surfaces;

a plurality of air-bearing low-flying heads to read information on said plurality of disks;

each of said disks including a substrate having a microscopic relief formed on each of said side surfaces to provide a pre-formatted structure for storing information;

a thin-film reflective layer on each of said side surfaces to reflect a lightbeam used for reading information; and a transparent thin-film protective layer on each of said reflective layers, the composition of said protective layers having weak stiction and low asperity being effective to allow said heads to fly over said side surfaces of said disks during operation of the information storage system.

9. A double sided optical storage media for a storing information in a high storage density information storage system comprising:

a substrate having a first and second side surface, said first side surface having a microscopic relief formed on an annular portions thereof;

a first thin-film reflective layer on said first side surfaces of said substrate to reflect a lightbeam; and a first transparent thin-film protective layer on said first reflective layer, the composition of said protective layers having stiction sufficiently weak and asperity sufficiently low to allow a read/write heads to fly over the double sided media at a predetermined low height during operation of the information storage system;

a second thin-film reflective layer on said second side surfaces of said substrate to reflect a lightbeam; and a transparent thin-film dielectric layer applied on said second reflective layer to isolate said second reflective layer;

an optically sensitive thin-film recording layer applied on said dielectric layer, the composition of said recording layer including a rare-earth transition-metal to magnetically store information; and a second protective layer on said recording layers, the composition of said protective layers having stiction sufficiently weak and asperity sufficiently low to allow a read/write heads to fly over the double sided media at a predetermined low height during operation of the information storage system.

10. The disk as in claim 9 wherein said relief in said first zone includes depressions having a depth of approximately ¼ the wave a thin-film reflective layer on said side surfaces of said substrate to reflect a lightbeam; and length of the lightbeam, and the relief in said second zone is in the form of a groove.

11. An optical storage media for a storing information in a high storage density information storage system comprising:

a substrate having a side surfaces, said side surfaces partitioned into a first and second zone, that portion of said side surface in said first zone including a relief compatible with a relief for read-only recording techniques, and that portion of said side surface in said second annular zone having a relief compatible with rewritable recording techniques;

a thin-film reflective layer on said side surfaces of said substrate to reflect a lightbeam; and a transparent thin-film dielectric layer applied on said reflective layer to isolate said reflective layer;

an optically sensitive thin-film recording layer applied on said dielectric layer, the composition of said recording layer including a rare-earth transition-metal to magnetically store information; and a protective layer on said recording layer, the composition of said protective layers having stiction sufficiently weak and asperity sufficiently low to allow a read/write heads to fly over the double sided media at a predetermined low height during operation of the information storage system.

12. An optical storage media for a storing information in a high storage density information storage system comprising:

a substrate having a side surfaces, said side surfaces partitioned into a first and second zone, that portion of said side surface in said first zone including a relief compatible with read-only recording techniques, and that portion of said side surface in said second annular zone having a relief compatible with rewritable recording techniques;

a thin-film reflective layer on said side surface of said substrate to reflect a lightbeam;

a transparent thin-film dielectric layer applied on said reflective layer to isolate said reflective layer;

an optically sensitive thin-film recording layer applied on said dielectric layer, the composition of said recording layer including a rare-earth transition-metal to magnetically store information; and a protective layer on said recording layer, the composition of said protective layers having stiction sufficiently weak and asperity sufficiently low to allow a read/write heads to fly over the double sided media at a predetermined low height during operation of the information storage system.

13. An optical storage media for storing read-only and rewritable data, comprising:

a substrate having a side surface, said side surface including a relief, the read-only data recorded in a portion of said relief compatible with read-only optical techniques, and the rewritable data recorded in a portion of said relief compatible with magneto-optical techniques;

a thin-film reflective layer on said side surface of said substrate to reflect a lightbeam;

a transparent thin-film dielectric layer applied on said reflective layer to isolate said reflective layer;

an optically sensitive thin-film recording layer applied on said dielectric layer, the composition of said recording layer including a rare-earth transition-metal to magnetically store information; and a protective layer on said recording layer, the composition of said protective layers having stiction sufficiently weak and asperity sufficiently low to allow a read/write heads to fly over the double sided media at a predetermined low height during operation of the information storage system.

14. The media as in claim 13 wherein that portion of said relief for storing read-only data includes depressions having a depth equal to approximately ¼ of the wavelength of the lightbeam, and that portion of said relief storing rewritable data being in the form of a groove.

* * * * *